(12) United States Patent
Bae (10) Patent No.: US 8,538,830 B1
(45) Date of Patent: Sep. 17, 2013

(54) METHOD, SERVER AND COMPUTER-READABLE RECORDING MEDIUM FOR PROVIDING USER-CUSTOMIZED INFORMATION USING E-BOOK SERVICE

(71) Applicant: Initial Communications Corp., Seoul (KR)

(72) Inventor: Ki Sik Bae, Seoul (KR)

(73) Assignee: Initial Communications Corp., Seoul (KR)

( * ) Notice: Subject to any disclaimer, the term of this patent is extended or adjusted under 35 U.S.C. 154(b) by 0 days.

(21) Appl. No.: 13/785,312

(22) Filed: Mar. 5, 2013

(30) Foreign Application Priority Data

Apr. 5, 2012 (KR) .......................... 10-2012-0035659

(51) Int. Cl.
*G06Q 30/00* (2012.01)
(52) U.S. Cl.
USPC ........................................ 705/26.1; 705/26.7
(58) Field of Classification Search
USPC ...................... 705/26.1, 26.7, 27.1
See application file for complete search history.

(56) References Cited

U.S. PATENT DOCUMENTS

| 7,103,848 | B2 * | 9/2006 | Barsness et al. | 715/776 |
| 8,380,632 | B2 * | 2/2013 | Dicke et al. | 705/59 |
| 2012/0116916 | A1 * | 5/2012 | Fleur | 705/26.7 |
| 2012/0191545 | A1 * | 7/2012 | Leibu et al. | 705/14.66 |

FOREIGN PATENT DOCUMENTS

| KR | 1020100001650 A | 1/2010 |
| KR | 1020100104627 A | 9/2010 |

OTHER PUBLICATIONS

Definition of "judge" (verb), Merriam-Webster online dictionary, downloaded Jul. 9, 2013 from http://www.merriam-webster.com/dictionary/judge.*
Definition of "subscription", Merriam-Webster online dictionary, downloaded Jul. 8, 2013 from http://www.merriam-webster.com/dictionary/subscription.*

* cited by examiner

*Primary Examiner* — Donald L. Champagne
(74) *Attorney, Agent, or Firm* — Husch Blackwell LLP (57) ABSTRACT

A method includes the steps of: (a) setting a relationship between users by referring to at least one piece of information on direction between the user who gives an e-book as a gift and the other user who receives it, information on the number of times the gift has been provided, and information on a price of the gift; (b) judging a first user and a second user whose degree of friendliness exceeds a preset value; and (c) acquiring information on a degree of involvement in reading that shows to which level the second user has read the gift, if the gift is provided from the first user to the second user; and (d) providing a service by referring to information on the gift, if the information on the degree of involvement in reading is judged to exceed a prefixed value.

24 Claims, 3 Drawing Sheets

| SUBJECT | OBJECT | E-BOOK GENRE | NUMBER OF GIFTS | A DEGREE OF INTIMACY |
|---|---|---|---|---|
| USER A | USER B | SF NOVEL | 7 | 11 |
| | | NATURAL SCIENCE | 2 | |
| | | ESSAY | 1 | |
| | | HUMANATIES AND SOCIAL SCIENCE | 1 | |
| | USER C | ROMANCE NOVEL | 10 | 17 |
| | | ESSAY | 5 | |
| | | HUMANATIES AND SOCIAL SCIENCE | 1 | |
| | | SOCIAL SCIENCE | 1 | |
| | USER D | SF NOVEL | 8 | 9 |
| | | NATURAL SCIENCE | 1 | |

| SUBJECT | OBJECT | E-BOOK GENRE | NUMBER OF GIFTS | A DEGREE OF INTIMACY |
|---|---|---|---|---|
| USER B | USER A | SF NOVEL | 6 | 8 |
| | | NATURAL SCIENCE | 1 | |
| | | HUMANATIES AND SOCIAL SCIENCE | 1 | |
| | USER E | SELF-IMPROVEMENT | 11 | 14 |
| | | ECONOMY & MANAGEMENT | 2 | |
| | | HISTORY & CULTURE | 1 | |

| SUBJECT | OBJECT | E-BOOK GENRE | NUMBER OF GIFTS | A DEGREE OF INTIMACY |
|---|---|---|---|---|
| USER A | USER B | SF NOVEL | 7 | 11 |
| | | NATURAL SCIENCE | 2 | |
| | | ESSAY | 1 | |
| | | HUMANATIES AND SOCIAL SCIENCE | 1 | |
| | USER C | ROMANCE NOVEL | 10 | 17 |
| | | ESSAY | 5 | |
| | | HUMANATIES AND SOCIAL SCIENCE | 1 | |
| | | SOCIAL SCIENCE | 1 | |
| | USER D | SF NOVEL | 8 | 9 |
| | | NATURAL SCIENCE | 1 | |

| SUBJECT | OBJECT | E-BOOK GENRE | NUMBER OF GIFTS | A DEGREE OF INTIMACY |
|---|---|---|---|---|
| USER B | USER A | SF NOVEL | 6 | 8 |
| | | NATURAL SCIENCE | 1 | |
| | | HUMANATIES AND SOCIAL SCIENCE | 1 | |
| | USER E | SELF-IMPROVEMENT | 11 | 14 |
| | | ECONOMY & MANAGEMENT | 2 | |
| | | HISTORY & CULTURE | 1 | |

METHOD, SERVER AND COMPUTER-READABLE RECORDING MEDIUM FOR PROVIDING USER-CUSTOMIZED INFORMATION USING E-BOOK SERVICE

CROSS-REFERENCE TO RELATED APPLICATIONS

This application claims priority to and the benefit of Korean Patent Application No. 10-2012-0035659 filed in the Korean Intellectual Property Office on Apr. 5, 2012, the entire contents of which are incorporated herein by reference.

FIELD OF THE INVENTION

The present invention relates to a method, a server, and a computer-readable recording medium for providing user-customized information by using an e-book service; and more particularly, to the method, the server, and the computer-readable recording medium for providing user-customized information more effectively by (i) collecting information on e-books given as a gift or exchanged among multiple users and/or on their subscription, (ii) judging human relationships such as friendliness among multiple users and individual users' propensities to read e-books from the collected information, and (iii) then providing a function of recommending an e-book and a friend for new human relationships.

BACKGROUND OF THE INVENTION

An e-book service is a service that may replace existing paper books and that allows a user to buy or borrow a book the user wants to get at an online bookstore or a mobile app store, and read the book bought or borrowed on a terminal such as a smart phone or a tablet PC. For e-books bought or borrowed through a website, an app store, etc., the patterns of consumption of users managed by a service provider are available for providing a better e-book service.

Recently, as the penetration rates of smart phones and tablet PCs are increasing, even the number of users who use the e-book service is on an increasing trend. In particular, in case of an e-book service using mobile terminals such as smart phones, table PCs, etc., providing customized information including an advertisement for users who subscribe specific e-books may be a very important factor for creating profits for an e-book service provider.

However, the service for providing customized information with e-books so far has been based on the information of e-books bought or borrowed and subscribed by users but has failed to use the relationships formed among multiple users who use e-books. Particularly, the recent trend in multiple users giving as gifts or exchanging a variety of products online including e-books by social networking services whose users are gradually increasing thanks to the penetration of smart phones and tablet PCs has not been reflected on the e-book service.

Accordingly, separate from the simple history of buying or borrowing individuals' e-books, the necessities of technologies to provide optimized and customized information by using human relationships formed through gifts (including a concept of exchange) of e-books among multiple users are on the rise.

SUMMARY OF THE INVENTION

It is an object of the present invention to solve all the problems mentioned above.

It is another object of the present invention to provide optimized and customized information to individual users differently from the past by collecting information on human relationships among multiple users who use an e-book service, information on e-books provided as gifts thereamong, information on subscribing/reading them and/or so forth, and providing a variety of services for individual users based on the collected information.

In accordance with one aspect of the present invention, there is provided a method for providing user customized information by using an e-book service, including the steps of: (a) setting a relationship between users by referring to at least one piece of information on direction between the user who gives an e-book as a gift and the other user who receives it, information on the number of times the gift has been provided, and information on a price of the gift; (b) judging a first user and a second user whose degree of friendliness exceeds a preset value by referring to information on the relationship between the users; and (c) acquiring information on a degree of involvement in reading that shows to which level the second user has read the gift, if the gift is provided from the first user to the second user; and (d) providing a service by referring to information on the gift, if the information on the degree of involvement in reading is judged to exceed a prefixed value.

In accordance with another aspect of the present invention, there is provided a method for providing user customized information by using an e-book service, including the steps of: (a) setting a relationship between users by referring to at least one piece of information on direction between the user who gives an e-book as a gift and the other user who receives it, information on the number of times the gift has been provided, and information on a price of the gift; (b) judging a first user and a second user whose degree of friendliness exceeds a preset value by referring to information on the relationship between the users; (c) acquiring information of the first user on buying or reading e-books, if the gift was provided from the first user to the second user; and (d) providing, if the first user also bought or read a first e-book provided as the gift to the second user by himself or herself, the second user with a second e-book bought or read by the first user before or after a preset time from the time when the first user bought or read the first e-book.

In accordance with still another aspect of the present invention, there is provided a method for providing user customized information by using an e-book service, including the steps of: (a) acquiring information of a first user on buying or reading e-books and information on a degree of involvement in reading showing to which level a second user has read a gift, if the gift is provided to the second user by the first user; and (b) providing, if the first user bought or read a first e-book provided as the gift to the second user by himself or herself and the information on the degree of involvement of the second user in reading is judged to exceed a prefixed value, the second user with information on a second e-book bought or read before or after the preset time from the time when the first user himself or herself bought or read the first e-book.

In accordance with still another aspect of the present invention, there is provided a server for providing user customized information by using an e-book service, including: a relationship setting part for setting a relationship between multiple users by referring to at least one piece of information on the direction between a user who provides an e-book as a gift and the other user who receives it, information on the number of times the gift has been provided, and information on the price of the gift; an information collecting part for acquiring, if the relationship setting part judges that a degree of friendliness between a first user and a second user exceeds a preset value by referring to information on the relationship between the users and the gift is provided from the first user to the second user, information on a degree of involvement in reading that shows to which level the second user read the gift; and a service providing part for providing a service by referring to information on the gift, if the information collecting part judges that the information on the degree of involvement in reading exceeds a prefixed value.

In accordance with still another aspect of the present invention, there is provided a server for providing user customized information by using an e-book service, including: a relationship setting part for setting a relationship between multiple users, if an e-book is given and received as a gift therebetween, by referring to at least one piece of information on the direction to which the gift is given, the number of times the gift has been provided, and the price of the gift; an information collecting part for acquiring, if the relationship setting part judges that a degree of friendliness between a first user and a second user exceeds a preset value by referring to information on the relationship between the users and if the gift was given to the second user by the first user, information of the first user on buying or reading e-books; and a service providing part for providing, if the first user also bought or read a first e-book provided as the gift to the second user by himself or herself, the second user with a second e-book bought or read by the first user before or after a preset time from the time when the first user bought or read the first e-book.

In accordance with still another aspect of the present invention, there is provided a server for providing user customized information by using an e-book service, including: a relationship setting part for acquiring information of a first user on buying or reading an e-book and information on a degree of involvement in reading showing to which level a second user has read the e-book provided as a gift, if the gift is provided to the second user by the first user; and a service providing part for providing, if the first user bought or read a first e-book provided as the gift to the second user by himself or herself and the information on the degree of involvement of the second user in reading is judged to exceed a prefixed value, the second user with information on a second e-book bought or read by the first user before or after the preset time from the time when the first user bought or read the first e-book.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Configuration of the Whole System

Figure 1:
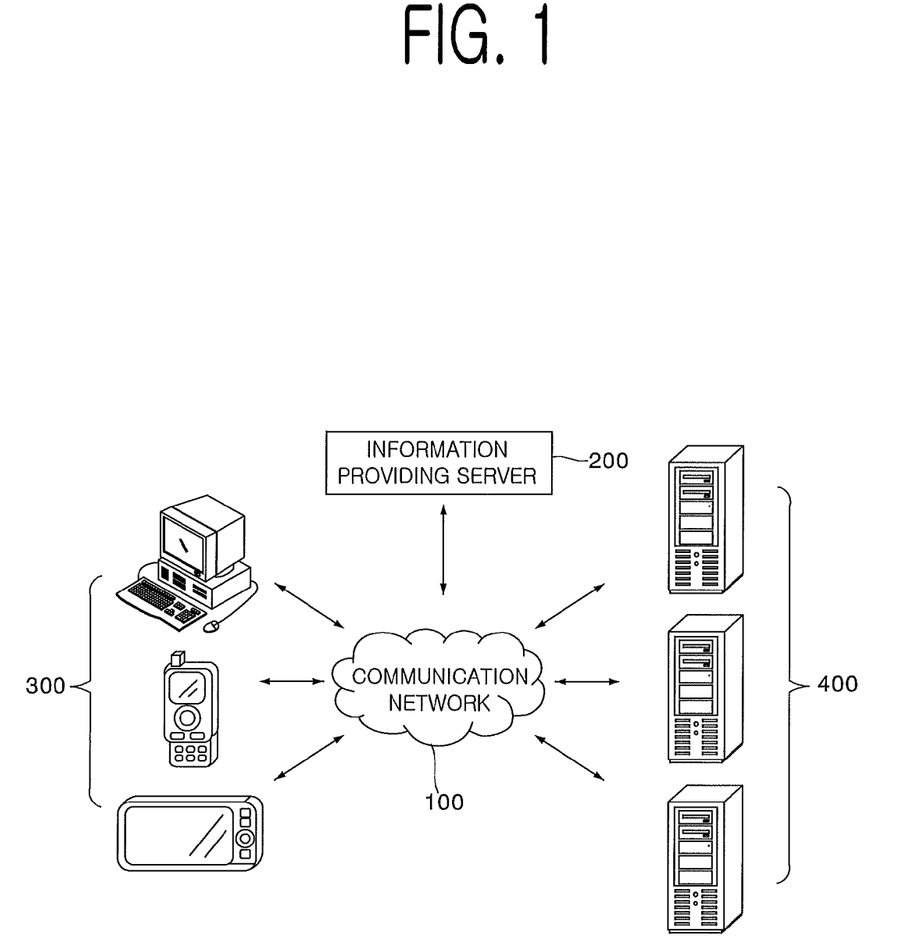
FIG. 1 is a diagram exemplarily representing a configuration of a whole system in accordance with one example embodiment of the present invention.

FIG. 1 exemplarily represents a configuration of the whole system in accordance with one example embodiment of the present invention.

As illustrated in FIG. 1, the whole system of the present invention may include a communication network 100, an information providing server 200, a user terminal 300, and any other server(s) 400.

First, the communication network 100 in accordance with one example embodiment of the present invention may be configured regardless of wired or wireless and may be configured in a form of a local area network (LAN), a metropolitan area network (MAN), a wide area network (WAN), and other diverse networks. More preferably, the network 100 in the present invention may be publicly known World Wide Web (www). However, the communication network 100 in accordance with the present invention may also include at least part of a publicly known wireless data communication network or a publicly known telephone network without being limited only to these.

Next, the information providing server 200 in accordance with an example embodiment of the present invention may collect information on e-books, provided as gifts among multiple users, which are bought or borrowed in an application market accessible from at least part of a website through the Internet or a user terminal 300, information on subscribing or reading the e-books provided as gifts and so forth. The information providing server 200 may store the collected information in a database, and provide a service by extracting required information and processing the information as customized information required for individual users. In accordance with one example embodiment of the present invention, the information providing server 200 may particularly judge the relationships among multiple users by collecting information on e-books provided as gifts among multiple users and the information on subscribing or reading the provided e-books as gifts, and provide user customized information thereunder. The detailed explanation on an internal configuration and components of the information providing server 200 will be made later.

In accordance with one example embodiment of the present invention, the user terminal 300 may run a computer program or an app for a mobile phone that allows a user to use the e-book service and provide the user customized information transmitted from the information providing server 200 for the individual users.

More specifically, the user terminal 300 in accordance with one example embodiment of the present invention means a digital device which includes a function of accessing the information providing server 200 and communicating with it. Such digital devices, including a personal computer (e.g., desktop, laptop, etc.), a workstation, a PDA, a smart phone, or an mobile phone, a tablet PC, an IPTV receiver, etc., which have memory means and micro processors with a calculation ability, may be adopted as the user terminal 300 in accordance with the present invention. The user terminal 300 may include a required program including an exclusive app, a web browser, a widget, a wap browser, IPTV-exclusive software, etc. to allow the user to get the service from the information providing server 200 and use the e-book service.

Next, the other server(s) 400 in accordance with one example embodiment of the'present invention may primarily collect information on the e-books bought or borrowed at an app market accessible from a website through the Internet, a smart phone, a tablet PC, etc. and information on the e-books provided as gifts (including a concept of exchange of the e-books) among multiple users, etc. and provide to the information providing server 200. For example, each e-book service provider may have a server to manage information on customer, information on the purchase history of the user who uses the e-book service, and information on description on gifts or exchanges among the users. The information providing server 200 may collect the information of users who use the e-book service from a variety of e-book service providers by accessing to the respective multiple servers 400 through the communication network 100. But this is merely one of examples and the information providing server 200 could directly perform a function of the servers 400.

Configuration of the Information Providing Server 200

Below will be explanation on an internal configuration and components of the information providing server 200 that performs important functions to implement the present invention.

Figure 2:
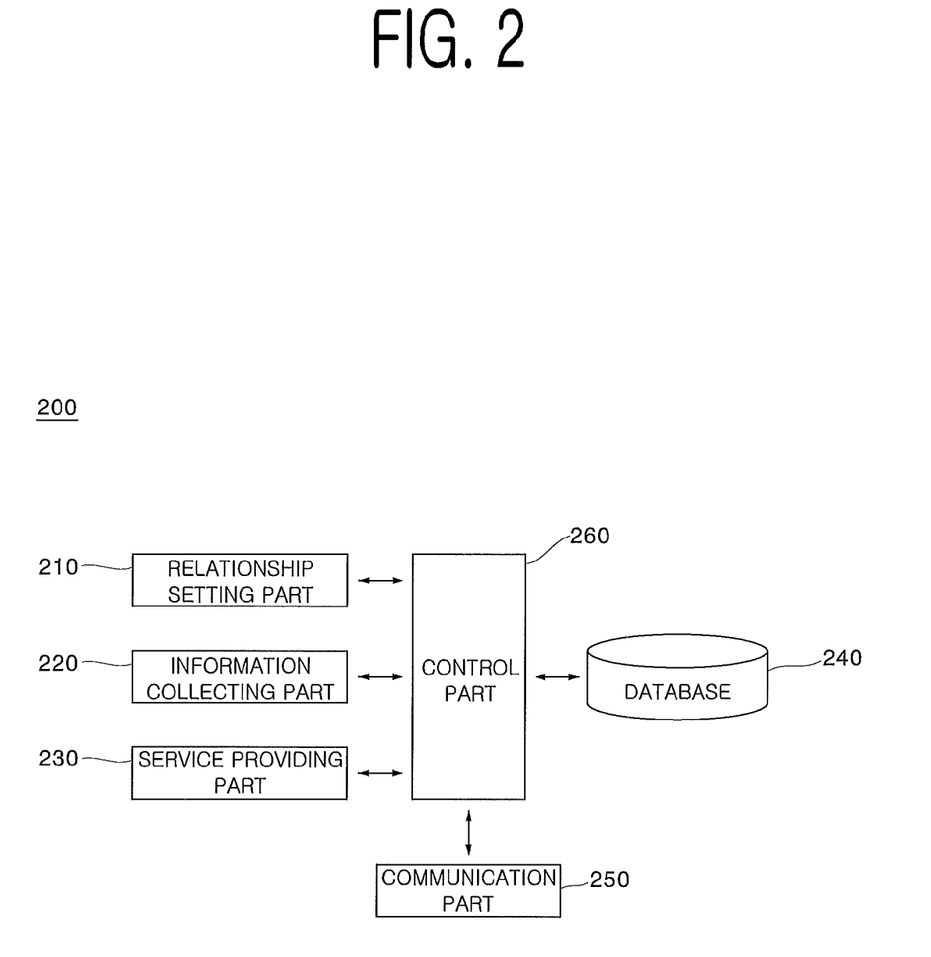
FIG. 2 is a drawing exemplarily representing an internal configuration of an information providing server in accordance with one example embodiment of the present invention.

FIG. 2 exemplarily represents an internal configuration of the information providing server 200 in accordance with one example embodiment of the present invention.

As illustrated in FIG. 2, the information providing server 200 in accordance with one example embodiment of the present invention may include a relationship setting part 210, an information collecting part 220, a service providing part 230, a database 240, a communication part 250 and a control part 260. In accordance with one example embodiment of the present invention, at least some of the relationship setting part 210, the information collecting part 220, the service providing part 230, the database 240, the communication part 250 and the control part 260 may be program modules communicating with the user terminal 300 and/or the other servers 400. Such program modules may be included in the information providing server 200 in a form of an operating system, an application program module and other program modules or physically stored in various storage devices well known to those skilled in the art. In addition, they may be stored in a remote storage device capable of communicating with the information providing server 200. The program modules may include but not be subject to a routine, a subroutine, a program, an object, a component, and a data structure for executing a specific operation or a type of specific abstract data that will be described in accordance with the present invention.

First of all, when the e-books are provided as gifts among multiple users, the relationship setting part 210 in accordance with one example embodiment of the present invention may set a relationship(s) between a user who gives an e-book as a gift and the other user(s) who gets it. More particularly, the relationship setting part 210 in accordance with one example embodiment of the present invention may set the relationship between the users by using at least a piece of information on a direction to which the e-books were given as gifts (from a gift provider to a gift receiver) by multiple users, information on the number of e-books given as gifts by them, and information on their prices. Among the pieces of information used to set the relationships between the users, the information on the direction may be information used to distinguish between a user A who provides the gift and a user B who gets it.

For example, if e-books exchanged between the users A and B are mainly related to self-help books and A unilaterally provided B with many books, the relationship setting part 210 may judge not only that A is B's senior at work or school but also that they have closer friendliness from information on the direction to which the gifts were given (from A to B) and information on how many books have been given as gifts. In addition, if a lot of e-book novels in the genre of romance are exchanged between the users A and B and it takes quite a short time for A and B, respectively, to read the e-books for the first time after they are given as gifts, it may be judged that A and B are lovers or very close friends. If e-books regarding a specific religion are mainly exchanged between the users A and B, it may be judged that A and B are friends with the same religion. Of course, there is a possibility to include an error in such inference and accordingly, the relationship setting part 210 may request a subject user to check whether the inferred relationship is correct.

The relationship setting part 210 may collect information on e-books to collect, information on subscriptions of e-books given as gifts or exchanged among multiple users, or other information by user, or by e-book service provider or under any other specific standards.

Only to a user who consents the use of information on e-books bought or borrowed by himself or herself and given to, or received from, other person, the relationship setting part 210 in accordance with one example embodiment of the present invention may collect information on the e-books and subscription. On characteristics of e-books distributed online, from the aspect that the information on the e-books is collected there may be a concern that billing information for buying or borrowing e-books could be collected as well. Therefore, in order to avoid a legal problem due to illegal use of private information arising from this, it could be possible to add a procedure for getting a prior consent from the user. In accordance with another example embodiment of the present invention, the relationship setting part 210 may also add an individual procedure for deciding the consent on information collection for each e-book bought by the user.

In accordance with another example embodiment of the present invention, the relationship setting part 210 may determine whether information on the list of e-books or information on friends made to a social network service (SNS) is overlapped by exceeding a predetermined rate or number by referring to at least one piece of the information on the list of the e-books and the information on the friends made to the SNS.

Next, the information collecting part 220 in accordance with one example embodiment may acquire information on buying or reading e-books provided as gifts among multiple users.

First of all, when the relationship setting part 210 judges users with a degree of friendliness exceeding the preset basic value by referring to the information on the relationships among the users, the information collecting part 220 acquires information on a degree of involvement in reading showing to which level a user, among the users having been judged to have the degree of friendliness exceeding the preset basic value, receiving the gift has read the e-book provided as a gift. At the time, the information on the degree of involvement in reading may include information on whether the user receiving the e-book as the gift subscribed the e-book, information on number of subscription, information on frequency of subscriptions, information on time spent from the time when the e-book is given as a gift until it is initially subscribed, information on the degree of progress of subscription or reading if the e-book is not completely read, information on the number of empathetic phrases separately stored during the reading of the e-book, or information on the number of SNS posts regarding the e-book. For example, the information collecting part 220 may give a higher degree of involvement in reading when the time spent from the time of receiving the e-book as a gift to the time of initial subscription is shorter, when there are more subscriptions of the e-book and/or when the frequency of subscriptions is higher.

In addition, when the relationship setting part 210 judges users with the degree of friendliness exceeding the preset basic value by referring to information on relationships among the users, the information collection part 220 may acquire information of the user, who gave the e-book as a gift, on buying or reading e-books. The information collection part 220 may classify and acquire information on buying and reading by genre, author, publisher, and price range of the e-book, by each user who gives the e-book as the gift to another user. In short, with respect to a specific user who gives an e-book as a gift to another user, it may be possible to collect information on buying, including when and how many e-books the specific user bought in each genre such as SF novel, essay, natural science, humanities and social science, or information on reading, including at least one of number and frequency of subscribing the bought e-books and the time spent from the time of buying to the time of initial subscription.

The service providing part 230 may provide a customized service for a user who uses an e-book service by referring to information collected and created by the information collecting part 220. The service providing part 230 may provide a variety of services for the user who gave the e-book or who received it as a gift by referring to the information collected by the information collecting part 220.

As one example embodiment, the service providing part 230 may provide the user with information on other e-books in a same or similar category as the e-book given as a gift by multiple users by referring to the information on the degree of involvement in reading created by the information collecting part 220. On assumption that a user A gave a user B an e-book in a SF genre, the information collecting part 220 collects information on a degree of involvement in reading showing to which level the user B read the received SF e-book. As mentioned above, the information on the degree of involvement in reading to be collected may include at least one piece of information on whether the user B subscribed the received SF e-book as the gift, information on the number of subscriptions, information on the frequency of subscriptions, information on the time spent from the time of receiving it as the gift to the time of initial subscription, and information on a degree of progress of subscription or reading if the user B did not read the whole SF e-book.

If the information on the degree of involvement in reading acquired by the information collecting part 220 exceeds the preset basic value, the service providing part 230 may provide the user A or B with the information on the other e-books belonging to the same or similar category as the SF e-book provided as the gift. The category may be decided by a variety of pieces of information including genre, author, publisher, price range, and compilation year of the e-book given as the gift. For example, the service providing part 230 may provide the user B with information on other e-books belonging to the same SF genre as the SF e-book given to the user B by the user A, or being compiled by the same author who compiled the SF e-book.

Besides, if the information on the degree of involvement in reading of the user B who received the e-book as the gift exceeds the preset basic value, the service providing part 230 may notify the user A who gave the e-book of the information on the degree of involvement of the user B in reading, and provide the user A with information on other e-books in the same or similar category as the e-book given to the user B by the user A. By providing such service, the user A may understand the satisfaction and interest of the user B regarding the gift provided by himself or herself. Accordingly, the user A may simply get information on other e-books that can be additionally given as gifts to the user B. As another example embodiment, if information on the degree of involvement of the user B in reading is below the preset basic value, the service providing part 230 may provide information on e-books in a completely different category from the e-book gifted to the user B by the user A.

The service providing part 230 may provide a service by using information of the user on buying or reading the e-book as a gift. On assumption that the user A gives the user B the e-book as a gift, the information of the user A on buying or reading the e-book is acquired by the information collecting part 220, and by referring to this, the service providing part 230 may decide the service provided for the user A or B.

For example, if the user A provides the user B with a first e-book as a gift, and the user A himself or herself buys or reads the first e-book, the service providing part 230 may provide the user B with information on a second e-book, etc. bought or read by the user A before or after a certain period of time from the time when the first e-book was bought or read by him or her. On the basis of the inclination of a person who purchases books, the second e-book bought or read before or after a certain period of time from the time when the first e-book was bought or read by the user A may be a book that may belong to a category similar to the first e-book or cause a first e-book reader to be more interested in. Accordingly, the user B may receive information not only on the first e-book gifted from the user A but also on the second e-book that the user B himself or herself may be interested in other than the first e-book, where "before or after a certain period of time" may mean a time region between the time when the user A bought or read the first e-book and the time before a certain period of time, or between the time when the user A bought or read the first e-book and the time after a certain period of time or both.

Otherwise, if the user A buys or reads a third e-book in a same or similar category as the first e-book gifted to the user B, the service providing part 230 may provide the user B with information on a fourth e-book bought or read by the user A before or after a certain period of time from the time when the user A bought or read the third e-book, in addition to information on the third e-book or independently. As such, it may be possible to selectively provide information on e-books that the user B may have interest in by deciding information on the e-books to be provided for the user B who received the e-book as a gift based on the same or similar category.

Furthermore, an e-book information service provided for the user B by referring to buying or reading information of the user A who gives a gift may be provided in connection with information on a degree of involvement in reading acquired by the information collecting part 220. In other words, if the user A provides as a gift the first e-book to the user B and himself or herself buys or reads the first e-book, and the information on the degree of involvement in reading of the user B who was provided as a gift the first e-book exceeds the preset basic value, the service providing part 230 may provide the user B with information on the second e-book bought or read before or after a certain period of time from when the user A bought or read the first e-book. By judging information on the e-book to be provided for the user B in additional consideration of the information on the degree of involvement of the user B in reading other than the information of the user A on buying or reading e-books, if the user B is not much interested in the first e-book, it may be possible to prevent the information on the second e-book from being provided for the user B, and finally to provide more optimized customized information for the user B.

As explained above, the relationship setting part 210 in accordance with one example embodiment of the present invention sets relationships among the multiple users from information including genres, authors, and publishers of e-books provided as gifts, the time taken to initially subscribe the gifted e-book, number and frequency of subscriptions and the latest time when the gifted e-books are subscribed. Accordingly, the service providing part 230 may provide individual users with information for setting new human relationships from those among multiple users set by the relationship setting part 210.

For instance, if the users A and B have exchanged a lot of e-books regarding the field of humanities and social science with each other and the users A and C also have exchanged many e-books in the field, the service providing part 230 may recommend the users B and C to each other as friends who are interested in the e-books in the same field. If the relationship is set from the customized information received by the users B and C, the users A, B, and C may share information on much more e-books with one another by forming a human network for using the e-book service.

Figure 3:
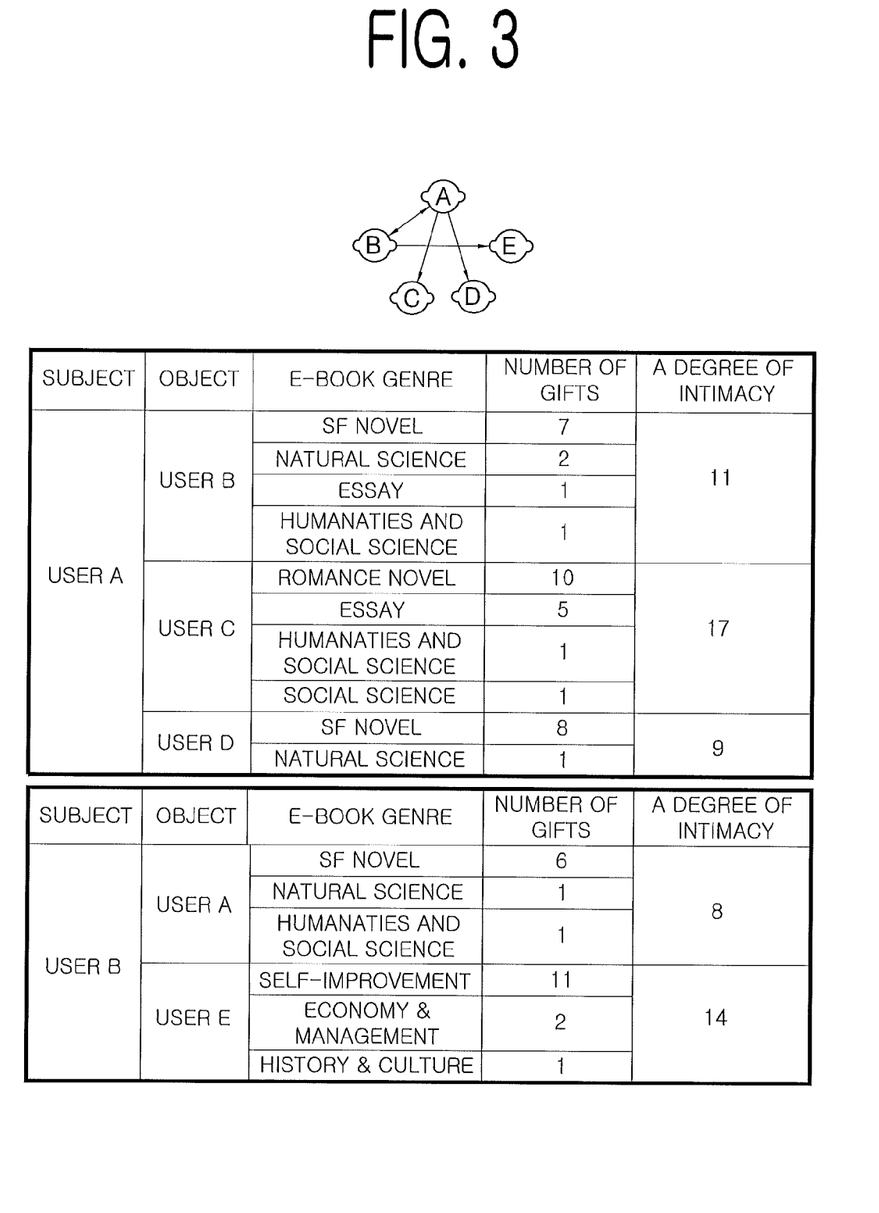
FIG. 3 is a diagram exemplarily showing a configuration providing an optimized service for individual users who use an e-book service in accordance with one example embodiment of the present invention.

FIG. 3 is a drawing exemplarily showing a configuration of providing an e-book service user with optimized and customized information based on relevant information in accordance with one example embodiment of the present invention.

By referring to FIG. 3, the user A provided e-books as gifts respectively to the users B, C and D and such information may be stored in a certain server(s) 200 or/and 400. More specifically, let's suppose that the user A gifted totally 11 books including seven SF novels to the user B and totally 17 books including 10 romance novels to the user C while giving totally nine books including eight SF novels to the user D.

Moreover, the user B provided e-books as gifts to the users A and E, respectively. Let's suppose that the user B gifted totally eight books including six SF novels and totally 14 books including 11 self-help books to the user E. The relationship setting part 210 may set the relationships among the users from A to E by collecting data as illustrated in FIG. 3 from a certain server.

First, looking at the relationship between the users A and B, it may be known that the users A and B have exchanged e-books, and particularly that SF novels account for overwhelmingly greatest percentage. Accordingly, the relationship setting part 210 may guess that the users A and B jointly have much more interest in SF novels. In case of the users A and C, A provided more e-books as gifts to C than to B and D, particularly from the aspect that the e-books provided as gifts to C by A were much limited to romance novels, it may be guessed that A and C are lovers or very close friends. In addition, even though they are lovers, it may be guessed that A is more active than C.

Furthermore, regarding the friendliness between the user A and the other users, it may be guessed that the user A has the closest relationship with the user C from the number of exchanged e-books or has the relationship to share the most matters of interest in the e-book service, and it may be judged that B and D have less friendliness with A than C has, and they are not lovers but they are just friends or have the senior-junior relationships. In FIG. 3, it was assumed that the friendliness is determined only with the number of gifted books, but it may be possible to set the friendliness of a user who recently has gifted a lot of e-books by giving a relatively higher weight to the recently provided e-books as gifts. Furthermore, it may be possible to set that users have close relationships if the gifted e-books are more expensive by reflecting the prices as well as the number of the gifted e-books, or it may be possible to set higher friendliness to the users who have exchanged a lot of e-books as gifts, not to either of them who has unilaterally provided e-books as gifts.

Next, taking a look at the user B in FIG. 3 as a provider of e-books as gifts, it can be known that the user B has provided SF novels as gifts mainly to the user A and extremely a lot of self-help books to the user E. Accordingly, the relationship setting part 210 may guess that the users B and A have the relationships to have common interest in the SF novel genre and at the same time that the user B is a senior of the user E at work or school. Because the number of e-books provided as gifts to the user E by the user B is more than that to the user A, it, furthermore, may be set that, the friendliness between the users B and E is higher than that between B and A.

From the example illustrated in FIG. 3, the users A, B, and D appear to have provided or have received as gifts, or have subscribed many e-books all in the SF novel genre. However, it may be found that while the users A and B, and the users A and D have formed specific relationships enough to give and receive e-books, the users B and D have no relationship enough to guess from the exchange of e-books. Therefore, the service providing part 230 may inform either of the user B and D that there is another user who is interested in the SF novel genre, and provide a service to lead a specific relationship between the users B and D to be formed.

The customized information given by the service providing part 230 may be provided not only for users whose relationships are not formed but also for those whose relationships have been created. In other words, it may be possible to recommend the user C for giving an e-book in a preferred genre by the user A in return for the genres of romance novels and essays provided as gifts by the user A, and it may be possible to recommend the user B for giving other e-books in the self-help genre worth gifting other than eleven self-help books already provided as gifts to the user E. As such, it is possible to provide a variety of types of customized information by databasing not only information on the e-books individually bought or borrowed and subscribed by individual users but also information on a pattern of gifting e-books among multiple users and then creating customized information.

For example, if the user A also buys or reads a first e-book in the essay genre provided as a gift to the user B by himself or herself, the service providing part 230 may provide the user B with information on a second e-book different from the first e-book provided as a gift to the user B by the user A while the two books are in the essay genre. At the time, the second e-book may be an e-book bought or read by the user A before or after a certain period of time from the time when the user A bought or read the first e-book.

In addition, because the information on the degree of involvement in reading showing to which level each user from A to E has read each e-book provided as a gift may be collected by the information collecting part 220, it may be possible to decide the service to be provided for each user from A to E by using the information. For instance, if the first e-book in the essay genre provided as a gift to the user B by the user A was also bought or read even by the latter, and the information on the degree of involvement of the user B in reading of the first e-book provided as a gift exceeds the preset basic value, the service providing part 230 may provide the user B with information on the second e-book in the essay genre just as the first e-book. The second e-book may be an e-book bought or read before or after a certain period of time from the time when the user A bought or read the first e-book. Through the method for providing such service, it may be possible to prevent information on e-books in a field that the user B does not want from being provided, and to provide the optimized and customized information.

In the database 240 in accordance with one example embodiment of the present invention, information on subscription of e-books of users collected from at least one of management servers 400 of an e-book service provider and information on gifts or exchange among multiple users may be stored. In this case, the information may be stored in connection with identification information of users. Even though FIG. 2 illustrates that the database 240 may be configured to be included in the information providing server 200, the database 240 may be configured separately from the information providing server 200 in accordance with the necessity of those skilled in the art who implement the present invention. In the present invention, the database 240 as a concept of including a computer-readable recording medium may include not only a narrow meaning of database but also a broad meaning of database such as data record based on file systems. From the aspect, it may be understood that, even a set of logs may be included in the concept of the database 240 in the present invention if it can be browsed and data can be extracted from the set.

In accordance with one example embodiment of the present invention, the communication part 250 may perform a function of allowing data to be transmitted and received from or to the information providing server 200.

Lastly, the control part 260 in accordance with one example embodiment of the present invention may perform a function of controlling data flow among the relationship setting part 210, the information collecting part 220, the service providing part 230, the database 240 and the communication part 250. In brief, the control part 260 in accordance with the present invention may control the flow of data from outside or among the components of the information providing server 200, and thereby allow the relationship setting part 210, the information collecting part 220, the service providing part 230, the database 240 and the communication part 250 to perform their unique functions.

On the other hand, it could be introduced as various embodiments other than the embodiment mentioned above. For example, the relationship setting part 210 may perform a function of acquiring at least one piece of information on the list of e-books held respectively by the multiple users and information on friends which are made by the individual users subscribed in a social network service and then deciding a first and a second users whose information on the list of the e-books or information on the friends subscribed and made with them, respectively, are overlapped by exceeding a predetermined rate or number. If information on a first degree of involvement in reading showing to which level the first user has read the e-book and information on a second degree of involvement in reading showing to which level the second user has done the same is acquired, the service providing part 230 may also perform a function of providing the second user with information on the e-books bought or read by the first user or vice versa by judging whether at least one piece of information on the first and the second degree of involvement in reading exceeds a prefixed value.

At the time, the service providing part 230 may also determine to which level the first and the second users, respectively, have read the duplicate e-books among those bought or read and held by them.

In this case, the service providing part 230 may provide each opposite user with information on e-books other than duplicate ones among the e-books bought or read and held respectively by the first and the second users and more specifically, it may provide information on e-books in a same or similar category as the duplicate e-books when offering to opposite users information on e-books other than the duplicate e-books they hold.

In accordance with the present invention, it may be possible to provide an optimized service based on e-books preferred by each user by (i) collecting information on personal relationship among multiple users who use an e-book service, information on an e-book and/or information on subscription or reading the e-book provided as a gift among the multiple users, etc., (ii) offering various services to individual users based on the collected information.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for providing user customized information by using an e-book service, comprising the steps of:
   (a) setting a relationship between users with a server by referring to one or more of the group consisting of at least one piece of information on the direction between a first user who gives an e-book as a gift and a second user who receives it, information on the number of times the gift has been provided and information on a price of the gift;
(b) acquiring and judging with a server information on a degree of involvement in reading that shows to which level the second user has read the gift; and
(c) providing a service by referring to information on the gift, if the information on the degree of involvement in reading is judged to exceed a prefixed value.

2. The method of claim 1, wherein, at the step (c), information on other e-books in a same or similar category as the gift is provided for the first or the second user.

3. The method of claim 2, wherein, at the step (c), if the information on a degree of involvement of the second user in reading is judged to exceed the prefixed value, this fact is provided for the first user and information on other e-books in the same or similar category as the gift is provided for the first user.

4. The method of claim 1, wherein the information on a degree of involvement in reading includes at least one piece of information on whether the e-book provided as the gift is subscribed by the second user, number of subscriptions, frequency of subscriptions, time spent from the gift received to an initial subscription, and a degree of progress of reading if part of the e-book has been read, the number of empathetic phrases separately stored during the reading of the e-book, or the number of SNS posts regarding the e-book.

5. The method of claim 1, wherein, at the step (a), a relationship between the users is set by (i) referring to at least one piece of information on the list of e-books retained respectively by the multiple users and information on friends made by the users in a social network service (SNS) and (ii) then additionally judging whether information on the list of the e-books or information on the friends is overlapped among the users by exceeding the predetermined rate or number.

6. A method for providing user customized information by using an e-book service, comprising the steps of:
(a) setting a relationship between users with a server by referring to one or more of the group consisting of at least one piece of information on the direction between a first user who gives an e-book as a gift and a second user who receives it, information on the number of times the gift has been provided and information on a price of the gift;
(b) acquiring and judging with a server information on a degree of involvement in reading that shows to which level the second user has read the gift; and
(c) providing, if the first user also bought or read a first e-book provided as the gift to the second user by himself or herself, the second user with a second e-book bought or read by the first user before or after a preset time from the time when the first user bought or read the first e-book.

7. The method of claim 6, further comprising the step of (d) providing, if the first user also bought or read a third e-book in a same or similar category as the first e-book, the second user with information on the third e-book and a fourth e-book bought or read before or after a preset time from the time when the first user bought or read the third e-book.

8. The method of claim 6, wherein the step (c) includes the step of providing the second user with information on the second e-book bought or read before or after the preset time from the time when the first user bought or read the first e-book if the information on the degree of involvement in reading is judged to exceed a prefixed value.

9. A method for providing user customized information by using an e-book service, comprising the steps of:
(a) acquiring and judging with a server information of a first user on buying or reading a first e-book and information on a degree of involvement in reading showing to which level a second user has read the first e-book provided as a gift from the first user; and
(b) providing, if the first user bought or read the first e-book provided as the gift to the second user by himself or herself and the information on the degree of involvement of the second user in reading is judged to exceed a prefixed value, the second user with information on a second e-book bought or read before or after the preset time from the time when the first user himself or herself bought or read the first e-book.

10. The server of claim 9, wherein the information on the degree of involvement in reading includes at least one piece of information on a subscription of the second user, number of subscriptions, frequency thereof, and time spent until the initial subscription from the time when the e-book was provided as the gift and a degree of progress of reading if only part of the e-book was read.

11. The method of claim 9, further comprising the step of:
(c) providing, if the first user also bought or read a third e-book in a same or similar category as the first e-book and the information on the degree of involvement of the second user in reading is judged to exceed a prefixed value, the second user with information on the third e-book and a fourth e-book bought or read before or after a preset time from the time when the first user bought or read the third e-book.

12. The method of claim 9, wherein, at the step (b), the information on the second e-book is provided by being selected as an e-book in a same or similar category as the first e-book.

13. A server for providing user customized information by using an e-book service, comprising:
a relationship setting part for setting a relationship between multiple users by referring to one or more of the group consisting of at least one piece of information on the direction between a first user who provides an e-book as a gift and a second user who receives it, information on the number of times the gift has been provided, and information on the price of the gift;
an information collecting part for acquiring and judging, if the relationship setting part judges that a degree of friendliness between a first user and a second user exceeds a preset value by referring to information on the relationship between the users and the gift is provided from the first user to the second user, information on a degree of involvement in reading that shows to which level the second user read the gift; and
a service providing part for providing a service by referring to information on the gift, if the information collecting part judges that the information on the degree of involvement in reading exceeds a prefixed value.

14. The server of claim 13, wherein the service providing part provides the first or the second user with information on other e-books in a same or similar category as the gift.

15. The server of claim 14, wherein, if the information on a degree of involvement of the second user in reading is judged to exceed the prefixed value, the service providing part provides that fact for the first user, and information on other e-books in the same or similar category as the gift for the first user.

16. The server of claim 13, wherein the information on the degree of involvement in reading includes at least one piece of information on whether the e-book provided as the gift is subscribed by the second user, number of subscriptions, frequency of subscriptions, time spent from the gift received to an initial subscription, and a degree of progress of reading if part of the e-book has been read, the number of empathetic phrases separately stored during the reading of the e-book, or the number of SNS posts regarding the e-book.

17. The server of claim 13, wherein the relationship setting part sets a relationship between the users by (i) referring to at least one piece of information on the list of e-books held respectively by the multiple users and information on friends made by the users in a social network service (SNS) and (ii) then additionally judging whether information on the list of the e-books or information on the friends is overlapped among the users by exceeding the predetermined rate or number.

18. A server for providing user customized information by using an e-book service, comprising:
   a relationship setting part for setting a relationship between multiple users, if an e-book is given and received as a gift therebetween, by referring to at least one piece of information on the direction to which the gift is given, the number of times the gift has been provided, and the price of the gift;
   an information collecting part for acquiring and judging, if the relationship setting part judges that a degree of friendliness between a first user and a second user exceeds a preset value by referring to information on the relationship between the users and if the gift was given to the second user by the first user, information on a degree of involvement in reading that shows to which level the second user has read the gift; and
   a service providing part for providing, if the first user also bought or read a first e-book provided as the gift to the second user by himself or herself, the second user with a second e-book bought or read by the first user before or after a preset time from the time when the first user bought or read the first e-book.

19. The server of claim 18, wherein, if the first user also bought or read a third e-book in a same or similar category as the first e-book, the service providing part provides the second user with information on the third e-book and a fourth e-book bought or read before or after a preset time from the time when the first user bought or read the third e-book.

20. The server of claim 18, wherein the service providing part provides the second user with information on the second e-book bought or read before or after the preset time from the time when the first user bought or read the first e-book, if the information on the degree of involvement in reading is judged to exceed a prefixed value.

21. A server for providing user customized information by using an e-book service, comprising:
   a relationship setting part for acquiring and judging information of a first user on buying or reading a first e-book and information on a degree of involvement in reading showing to which level a second user has read the first e-book provided as a gift from the first user; and
   a service providing part for providing, if the first user bought or read the first e-book provided as the gift to the second user by himself or herself and the information on the degree of involvement of the second user in reading is judged to exceed a prefixed value, the second user with information on a second e-book bought or read by the first user before or after the preset time from the time when the first user bought or read the first e-book.

22. The server of claim 21, wherein the information on the degree of involvement in reading includes at least one piece of information on a subscription of the second user, number of subscriptions, frequency thereof, and time spent until the initial subscription from the time when the e-book was provided as the gift and a degree of progress of reading if only part of the e-book has been read.

23. The server of claim 21, wherein if the first user also bought or read a third e-book in a same or similar category as the first e-book and the information on the degree of involvement of the second user in reading is judged to exceed the prefixed value, the service providing part provides the second user with information on the third e-book and a fourth e-book bought or read before or after a preset time from the time when the first user bought or read the third e-book.

24. The server of claim 21, wherein the service providing part provides the information on the second e-book by selecting the e-book in a same or similar category as the first e-book.

* * * * *